United States Patent [19]
Hay

[11] 3,915,428
[45] Oct. 28, 1975

[54] PETCOCK
[75] Inventor: Walter Hastings Hay, Palo Alto, Calif.
[73] Assignee: Boocock Specialties, Inc., Redwood City, Calif.
[22] Filed: Jan. 28, 1975
[21] Appl. No.: 544,765

[52] U.S. Cl. ............................................. 251/175
[51] Int. Cl.² ........................................ F16K 25/00
[58] Field of Search ........................... 251/179, 319

[56] References Cited
UNITED STATES PATENTS

| | | | |
|---|---|---|---|
| 2,991,972 | 7/1961 | Busby | 251/175 |
| 3,201,081 | 8/1965 | Lyon | 251/175 X |

*Primary Examiner*—Harold W. Weakley
*Attorney, Agent, or Firm*—Flehr, Hohbach, Test, Albritton & Herbert

[57] ABSTRACT

A petcock has body with an inlet and outlet and a plunger reciprocable between open and closed positions. Annular seals on the plunger on each side of the outlet act severally in the open and closed plunger positions. The plunger at least is formed of thermoplastic material and the seals, when active, are circumferentially stressed. An exterior portion of the plunger serves for reciprocating the same and coacts with a body flange to guide and hold the plunger in the body.

3 Claims, 3 Drawing Figures

U.S. Patent  Oct. 28, 1975  3,915,428
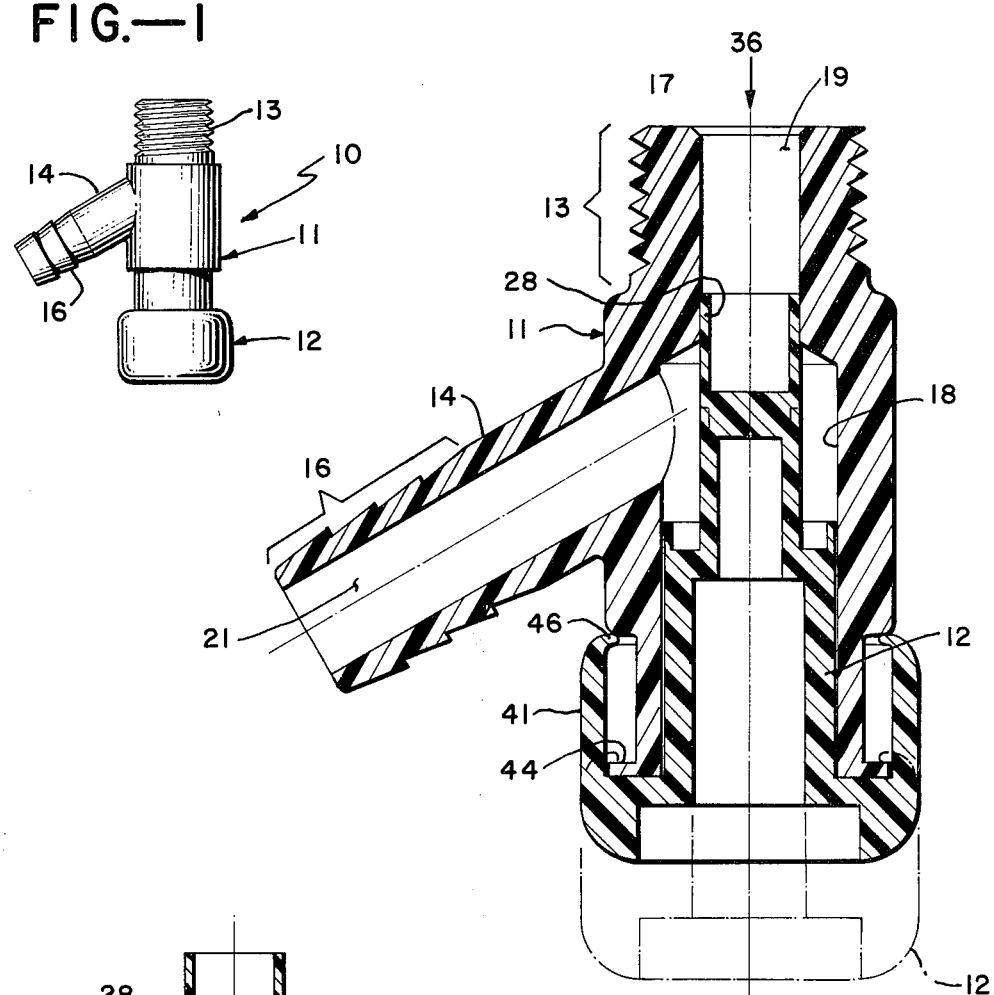
FIG.—1
FIG.—2
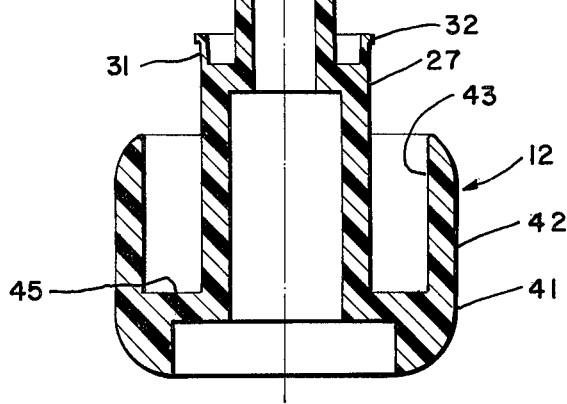
FIG.—3

PETCOCK

BACKGROUND OF THE INVENTION

This invention concerns valve structures and is directed to a two-piece petcock having a reciprocable plunger.

The petcock, a small plug cock or valve mounted in a pipe or the like for purposes of draining, has commonly been fabricated so that the plug portion rotates with respect to the body. Mechanical seals, O-rings, or packings were arranged on each end of the plug to establish fluid seals between the plug and body. It is considered desirable that a new and improved construction of petcock be made to greatly simplify the petcock structure including its seals and to permit fabrication by the economical method of injection molding of thermoplastic materials, thereby to take advantage of the properties inherent in these materials to achieve simplified sealing structures. Further, in a service such as installation of a petcock in motorcycle fuel tank, it is desirable that the petcock be switched from open to closed position and to be configurated so as to give no doubt to the user or observer as to which condition the valves has been placed.

SUMMARY OF THE INVENTION AND OBJECTS

In summary the invention is directed to a petcock comprising a hollow body with inlet and outlet flow passageways and a plunger within the body reciprocable between open and closed positions. The body has two aligned bores of different diameters with the first bore of smaller diameter communicating between the inlet and outlet passageways and the second bore of larger diameter extending from near the outlet passageway to the exterior of the body at one end. The plunger has first and second connected, cylindrical portions with the first cylindrical portion being dimensioned to slidably interfit the first bore of the body and the second cylindrical portion being dimensioned to slidably interfit the second bore of the body. An end region of the cylindrical plunger portion has an annular wall which, when relaxed, is slightly larger in diameter than the first bore, and when within the first bore, is circumferentially stressed to establish the fluid pressure seal against the surface of the bore. The inner end of the second cylindrical plunger portion has a projecting annular wall which, when relaxed, is slightly larger in diameter than the second bore and, when within the second bore, is circumferentially stressed to establish a second pressure seal against the surface of the bore. One end of the petcock body has a radially outwardly extending guide flange thereon and the plunger includes means exterior to the bores which coacts with the guide flange serving to maintain the plunger aligned in the body when reciprocated between open and closed positions. The latter portion of the plunger includes keeper means which serves to maintain the plunger within the bores.

An important object of the invention is to provide a petcock construction of greatly simplified form and which includes fluid tight seals formed integrally upon the plunger of the petcock.

Another object of the invention is to provide an improved petcock of the type described having an offset outlet passageway and a plunger actuated by reciprocation between closed and open positions so that the observer may determine visually and by feel the operative position of the petcock.

Another object of the invention is to provide an improved petcock construction which may be formed by injection molding of thermoplastic materials in only two independent parts which may be readily assembled together to form petcock structure which has a long service life.

Other objects and advantages of the invention will be apparent from the following detailed description considered with the accompanying drawing.

BRIEF DESCRIPTION OF THE DRAWING

FIG. 1 is a perspective view of the petcock structure of the present invention;

FIG. 2 is a greatly enlarged longitudinal sectional view of the petcock shown in FIG. 1; and FIG. 3 is a longitudinal sectional view of the plunger for the petcock of FIGS. 1 and 2 shown in the condition before its assembly into the petcock body.

DESCRIPTION OF THE PREFERRED EMBODIMENT

A preferred form of petcock structure 10 incorporating the present invention is shown in the drawing and includes a hollow petcock body 11 and a plunger 12 operatively reciprocable in said body between open and closed positions. Both the body 11 and the plunger 12 are formed preferably in the injection molding process from a suitable thermoplastic material such as moldable nylon, the grades of which are well known in the art.

The body 11 is illustrated in FIGS. 1 and 2 in its normal operative position and has the general configuration in that position of an inverted Y. The body is equipped at one end with male threads 13 for connection to an associated coupling such as may be found in the fuel tank of a motorcycle or the like and serves as the inlet. The offset portion 14 of the body comprises the outlet and may be equipped with suitable male threads 16 for connecting the outlet 14 to plastic tubing (not shown) such as for delivering fuel through the petcock 10 to a carburetor. It will be understood that the specific form of threads 13, 16 may be varied to suit the purpose or service from which the petcock 10 is intended.

Referring specifically to FIG. 2 the body 11, being hollow, is provided with two aligned bores 17 and 18 respectively on different diameters. The first bore 17, which is of smaller diameter than the bore 18, extends between the inlet flow passageway 19 and the outlet flow passageway 21 in the body offset 14. The second bore 18 extends from a region near the outlet passageway 21 to the exterior of the body 11 as is clearly shown in FIG. 2. Both bores 17, 18 are smooth and unobstructed thereby permitting an efficient seal against fluid pressure through the petcock.

Considering the plunger 12 which is illustrated plainly in FIGS. 2 and 3, it will be seen that the plunger comprises first 26 and second 27 connected and aligned cylindrical portions. The first cylindrical portion of the plunger 26 is dimensioned to slidably interfit the first bore 17 and the second cylindrical portion 27 is dimensioned to slidably interfit the second bore 18 of the body 11. An annular wall 28 of the first cylindrical portion 26 has an outside diameter which, when the wall 28 is relaxed, is slightly larger in diameter than the first bore 17. For example, the annular wall 28 may have an outside diameter of 0.220 inches and the inside diameter of the first bore 17 may be 0.217 inches so that the wall 28, when relaxed, is 0.003 of an inch oversized with respect to the first bore 17. It will be understood that when the wall 28 is operatively arranged within the bore 17 that the wall is circumferentially stressed serving to establish a fluid pressure seal with the surface of the first bore 17. Such a relationship is shown in FIG. 2.

An annular wall 31 is formed on the inner end of the second cylindrical portion of the plunger and includes a circumferential lip 32. The annular wall 31, when relaxed, is slightly larger in diameter than the second bore 18 and may for example be about 0.003 of an inch oversized with respect to the bore 18. When the wall 31 and lip 32 are within the bore in the operative condition of the valve as illustrated in FIG. 2, the wall is circumferentially stressed to establish a second pressure seal with the surface of the bore 18.

Both the fluid pressure seal established with the wall 28 and the second seal established with the wall 31 resist fluid pressure which normally would be in the direction of the arrow 36, of FIG. 2. The first pressure seal would be operative when the petcock plunger is in the closed position as indicated in FIG. 2 in full lines. When the petcock is in the opened condition as indicated by the broken lines in FIG. 2, the first seal of the annular wall 27 is withdrawn effectively from the bore 17 and at this time the seal established with the wall 31 becomes operative for directing fluid from the inlet 19 to the outlet while preventing leakage through the bore 18.

A knob 41 is formed integrally on the outer end of the second cylindrical portion 27 and the knob 41 is sized for grasping by the fingers for reciprocating the plunger between opened and closed positions to operate the petcock. The knob is provided with an outside annular wall 42 (FIG. 3) which has a smooth inner surface 43 formed coaxially with the annular sealing walls 28 and 31. A guide flange 44 is formed integrally at the end of the body 11 containing the second bore, the flange extending radially outwardly of the body and has an outer periphery formed coaxially with the bores 17 and 18. The guide flange 44 engages the surface 43 of the knob for maintaining the plunger axially and circumferentially aligned during the reciprocating movements between open and closed positions thereby preserving the effectiveness of the seals.

Prior to installation of the plunger 12 into the hollow body, the end of the annular wall 42 of the knob is formed as shown in FIG. 3 and is in the longitudinally extending condition. After assembly of the plunger to the body, the end of the wall 42 is rolled over to a form illustrated in FIG. 2, forming an inwardly projecting keeper lip or flange 46 which, when the plunger is in the open condition as illustrated by broken lines in FIG. 2, engages the underside of the guide flange and prevents removal of the plunger from the body. The coaction between the keeper lip or flange 46 and the guide flange 44 serves to define the open condition of the petcock in a positive manner. A radially extending abuttment wall 45 connects the skirt-like wall 42 of the knob to the second cylindrical portion 27. The abuttment wall 45 coacts with the end surface of the guide flange 44 to establish the closed or non-flow condition of the petcock 10, as shown in FIG. 2.

It will be observed from FIG. 2 that the inner portion of the second bore 18 is tapered towards the first bore 17 facilitating reentry of the annular wall 28 into the bore 17 and thereby to reestablish the first seal therewith when the plunger is shifted from the open to the closed position.

In view of the above description it will be apparent that there has been disclosed herein a greatly simplified petcock construction, having only two separate parts — the body 11 aand plunger 12 — and including integrally formed fluid pressure seals. When the petcock is shifted to the open condition such condition may be easily recognized by feel and visually especially so when the plunger portion is formed of a nylon material of a contrasting color to that of the body. The open position of the petcock is illustrated in FIG. 1. The invention disclosed herein may be readily formed of a moldable thermoplastic material as is well known in the art and affords great economies in petcock manufacturing. The nylon material from which the petcock is preferably formed provides a long service life for the disclosed design.

It will be apparent to those having ordinary skill in the art that changes may be made in the details of the preferred embodiment disclosed above without departing from the spirit of the invention. Therefore the present invention shall not be limited except as defined in the claims which follow.

I claim:

1. In a petcock comprising a hollow body having means forming inlet and outlet flow passageways, and plunger means within the body reciprocable between closed and opened positions, the body having two aligned bores on different diameters, the first bore of smaller diameter communicating between the inlet and outlet passageways and the second bore of larger diameter extending from a region near the outlet passageway to the exterior of the body at one end thereof, the plunger means comprising first and second connected and aligned cylindrical portions, the first cylindrical portion being dimensioned to slidably interfit the first bore and the second cylindrical portion being dimensioned to slidably interfit the second bore, the end region of the first cylindrical plunger portion having an annular wall which when relaxed is slightly larger in diameter than the first bore and when within the first bore is circumferentially stressed to establish a fluid pressure seal against the surface of the bore, the inner end of the second cylindrical plunger portion having a projecting annular wall which when relaxed is slightly larger in diameter than the second bore and when within the second bore is circumferentially stressed to establish a second pressure seal against the surface of the bore, said one end of said body having a radially outwardly extending guide flange thereon said plunger means including means exterior to said bores coacting with said guide flange serving to maintain said plunger means aligned in said body when reciprocated between closed and opened conditions, said last named means including keeper means serving to maintain said plunger means within said bores.

2. The petcock of claim 1 wherein said last named means of said plunger comprises a hollow, knob-like configuration sized for grasping with the fingers, and including an annular wall having an inner surface coaxial with said aligned cylindrical portions and connected to said second cylindrical portion by a radially extending abuttment wall, said abuttment wall coacting with said guide flange for arresting inward movement of said plunger in said bores serving to establish the closed or non-flow condition of said petcock.

3. The petcock of claim 1 wherein said keeper means includes a radially inwardly projecting portion engageable with said guide flange of said body and coacting with said guide flange to establish the open or flow condition of said petcock.

* * * * *